No. 75,121.

N. F. BURNHAM.
WATER WHEEL.

PATENTED MAR. 3, 1868.

2 SHEETS—SHEET 1.

Witnesses:
J. C. Kemon
C. A. Pettit

Inventor,
N. F. Burnham
By Munn & Co.
Attorneys

No. 75,121. N. F. BURNHAM. WATER WHEEL. PATENTED MAR. 3, 1868.

2 SHEETS—SHEET 2.

UNITED STATES PATENT OFFICE.

N. F. BURNHAM, OF YORK, PENNSYLVANIA.

IMPROVEMENT IN WATER-WHEELS.

Specification forming part of Letters Patent No. 75,121, dated March 3, 1868.

*To all whom it may concern:*

Be it known that I, N. F. BURNHAM, of the city and county of York, and State of Pennsylvania, have invented a new and Improved Case for Water-Wheels; and I do hereby declare the following to be a full, clear, and exact description of the same, sufficient to enable those skilled in the art to which my invention appertains to make use of it, reference being had to the accompanying drawings, forming part of this specification, in which—

Figure 1:
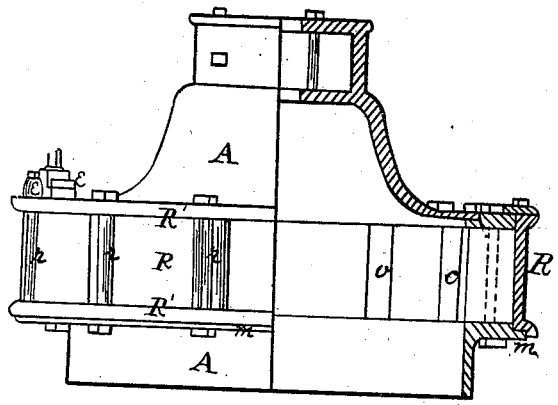
Figure 2:
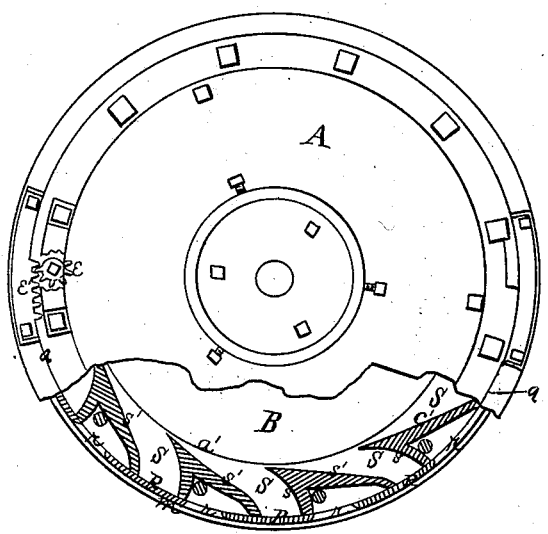
Figure 3:
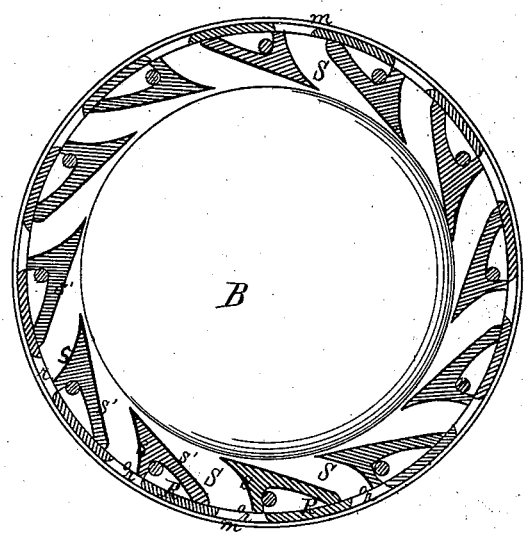

Figure 1 is a side elevation, the right-hand side of the wall being broken away. Fig. 2 is a plan, a portion of the cover being removed. Fig. 3 is a horizontal section.

In this invention curved chutes or water-passages of peculiar form are arranged around a circular case, and used in connection with a system of gates so constructed and operating with the chutes as to direct the water upon the wheel in such a manner that its whole force is utilized.

In the wheel-cases hitherto used, the passages or chutes through which the water passes from the outside of the case to the wheel within it have either been made with straight converging walls, or walls so curved that the water is directed across the rim of the wheel, instead of striking it tangentially, and thus exerting its whole force.

The object of the present invention is to construct the water-passages in such a form that the water shall be thrown from them upon the wheel in a line nearly tangent to its circumference, so as to exert its whole leverage at the perimeter of the wheel and in a line with its motion.

In connection with such a system of water-passages, I employ a system of gates so operating that, whether the whole head of water is let upon the wheel or not, it will always be directed upon the wheel-buckets in the manner described, and its entire force utilized.

In the drawings, A represents the body of the wheel-case, the form of it being like that of the cases in common use in connection with turbine wheels, and the central space occupied by the wheel being shown at B. The water enters upon the wheel through a series of openings, *o o*, arranged around the entire circumference of the case, and acts upon every bucket of the wheel at once. In passing from the outer wall, *a*, to the inner wall, *a'*, of the case, it traverses chutes S S, arranged as shown in Fig. 2, each chute having a short concave wall, *s*, on one side, and a long wall, *s'*, on the opposite side, the inner end of which is straight and the outer convex, as seen in the drawing referred to. These walls are so arranged as to be nearly or quite parallel, the convex portion of wall *s'* being opposite to and about equally curved with the concave wall *s*. Thus arranged, the walls inclose between them the curved space or water-passage S, the outer end of which allows the water to enter freely in a direction toward the center of the wheel, and the inner end of which is bent around so as to discharge the water tangentially to the wheel, as above described.

In connection with a case thus constructed, I use, for a gate to open or close all the chutes at once, a slotted ring, R, which fits around the enlarged portion of the case, and can be partially rotated to the right or left by means of a segment spur-wheel, *e*, and rack *e'*. The upper and lower edges of the ring are strengthened by stout flanges or rims R' R', and at the bottom it rests upon a projecting horizontal flange, *m*, which extends around the case at the outer edge of the floor of the water-passages. The width of the ring R is equal to the height of the walls *s s'* of the chutes, and the width of its slots *r r* is equal to the width of the chutes at their outer end, so that when the slots are brought in front of the chutes, the latter are wide open and the water passes freely to the wheel. The ring may be moved so as to open the chutes more or less as the mill may require, and by moving it around to the position shown in Fig. 2 the slots *r r* will come between the chutes and the latter will be entirely closed.

I am aware that wheel-curbs have been constructed with curved chutes having vertically-sliding gates to open or close them. The operation of these mills is essentially different from mine, as, when their gates are partially open, the water rushes in under the gate, spreads out the whole width of the chute, and partially loses its force before it is thrown upon the buckets.

I am also aware that curbs have been constructed having horizontally-sliding gates and straight chutes, which discharge the water against the buckets tangentially to their circle of motion.

My curved chute, however, has an important advantage over all these, resulting from the peculiar conformation and arrangement of its walls with reference to the action of the inflowing water. In my wheel the water rushes in through the open or partially-closed gate, and falls upon the concave wall $s$, which it follows in a dense, compact body, and from which it is thrown in a compact mass upon the bucket, exerting all its power upon it. In no wheels with straight chutes can this result be attained, but the whole force of the water is in them utilized only when the gates are wide open.

When, in a wheel with straight chutes, the gates are partially opened, the water, immediately after passing the narrow aperture, spreads out in the chute behind the gate and loses its force, while in mine it is gathered and retained in a compact mass by the curvature of the wall $s$, as above explained, and in that form is directed upon the buckets with its whole power. The result of this is, that in my wheel the power exerted is in exact proportion to the amount of water let upon it through the gates. If the latter be one-fourth open, the wheel moves with one-fourth of its whole power; if one-half open, with one-half of its power, &c.

It is possible that, with straight chutes, gates opening in the same way that mine open may have been heretofore used. I do not broadly claim the use of such gates; but, Having described my invention clearly, as above set forth, what I claim as new, and desire to secure by Letters Patent, is—

The combination of the curved chutes $s\ s'$, when constructed with curved walls near their outer extremity, and straight slightly-converging walls toward their inner extremity, in the manner described and shown, with the gate-ring R surrounding said chute, and having the openings $r\ r$, the whole device operating to receive the water in a direction toward the center of the wheel, and turn it by the concave wall until it is thrown in a compact mass against the buckets, tangentially to them, in the manner described.

N. F. BURNHAM.

Witnesses:
   HENRY REISINGER,
   L. H. MYERS.